July 22, 1958 W. S. TANDLER ET AL 2,844,033
RADIANT ENERGY MEASUREMENT METHODS AND APPARATUS
Filed Jan. 31, 1955 2 Sheets-Sheet 1
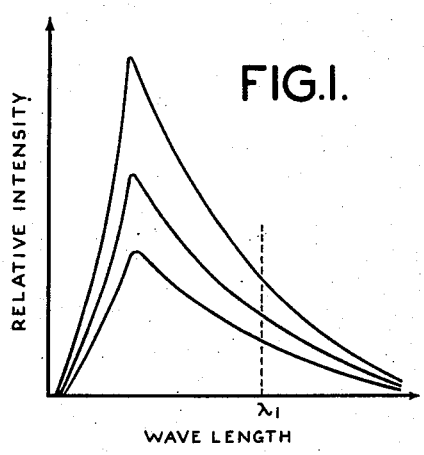
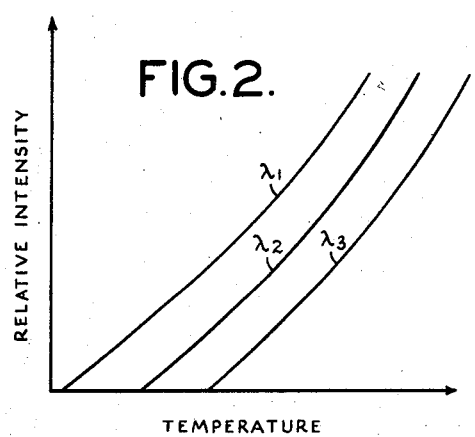
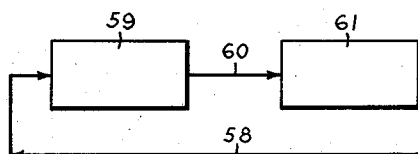
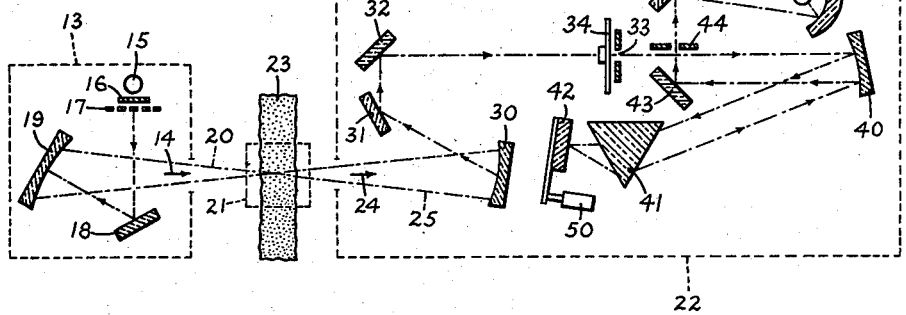
INVENTORS
WILLIAM S. TANDLER
MORRIS GROSSMAN
RICHARD H. TOURIN
BY
THEIR ATTORNEYS July 22, 1958     W. S. TANDLER ET AL     2,844,033
RADIANT ENERGY MEASUREMENT METHODS AND APPARATUS
Filed Jan. 31, 1955                          2 Sheets-Sheet 2
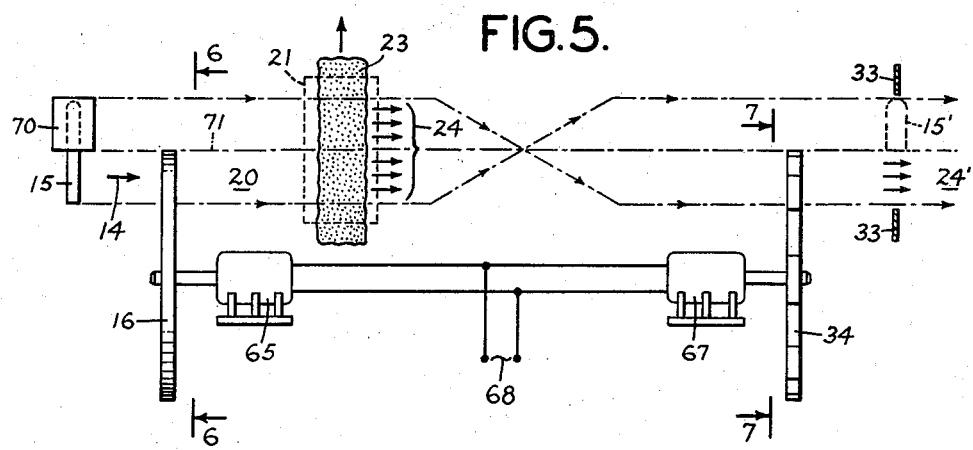
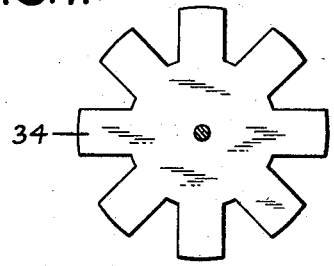
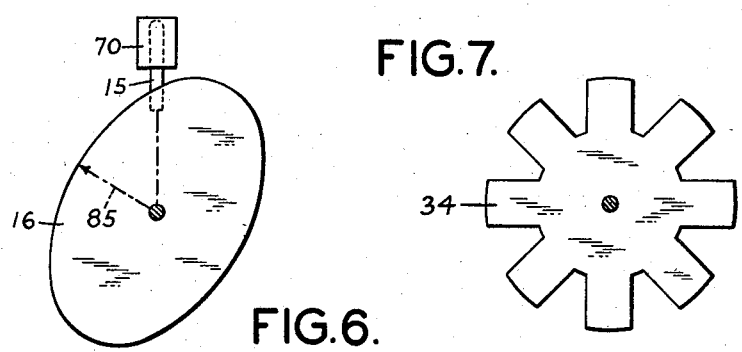
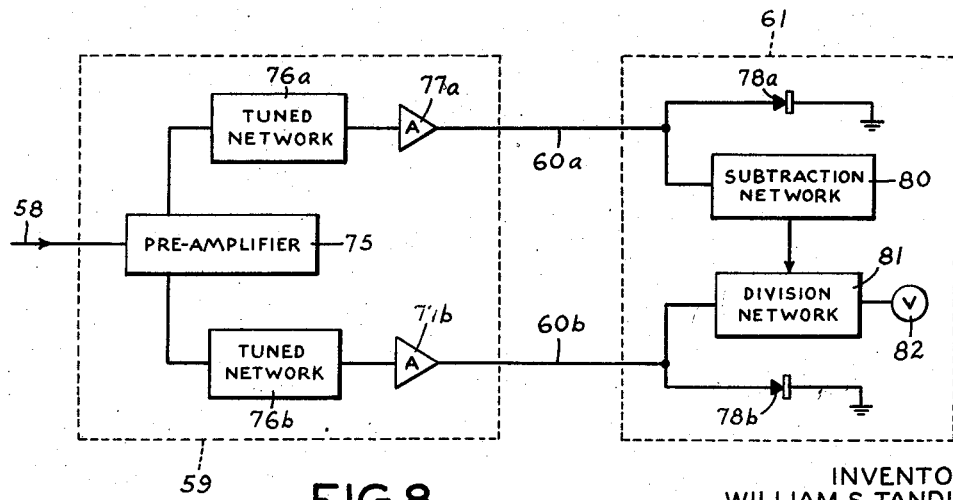
INVENTORS
WILLIAM S. TANDLER
MORRIS GROSSMAN
RICHARD H. TOURIN
BY
THEIR ATTORNEYS United States Patent Office 2,844,033
Patented July 22, 1958

2,844,033

RADIANT ENERGY MEASUREMENT METHODS AND APPARATUS

William S. Tandler, New York, Morris Grossman, Brooklyn, and Richard H. Tourin, Flushing, N. Y., assignors to The Warner & Swasey Research Corporation, Cleveland, Ohio, a corporation of Ohio Application January 31, 1955, Serial No. 484,982

13 Claims. (Cl. 73—355)

This invention relates generally to radiant energy measurement methods and apparatus, and more particularly to methods and apparatus of this character for obtaining an indication determinative of the temperature of hot bodies.

Disclosures which are related in part to that of this application appear in applicants' co-pending applications, Serial Nos. 484,884 and 485,262, both filed on January 31, 1955.

In measuring the temperature of combustion reaction gases or other very hot bodies, the measurement conditions are often such as to exclude the use of conventional measuring instruments operative by direct contact with, or introduction into the body. This is so since, for example, such conventional instruments cannot withstand, without injury, direct exposure to the high temperatures involved. Thus it becomes necessary to make hot body temperature determinations by radiant energy measurement at a distance. Such radiant energy measurements have, however, not previously been used extensively for gases for the reason that no satisfactory methods and apparatus have been developed in the prior art for obtaining measurements fully determinative of the temperature of the hot body.

It is an object of this invention, accordingly, to provide radiant energy measurement methods and apparatus adapted to give one or more measurements fully determinative of the temperature of an observed hot body.

Another object of this invention is to provide methods and apparatus of the above-noted character wherein substantially simultaneous readings may be taken of a plurality of quantities conjointly determinative of the mentioned temperature.

Yet another object of the invention is to provide methods and apparatus of the above-noted character characterized by elimination of factors extraneous to the mentioned temperature determination.

A further object of the invention is to provide methods and apparatus of the above-noted character wherein the mentioned temperature determination may be made by measurement of a single quantity determinative thereof.

These and other objects of the invention are realized by methods and apparatus wherein radiant energy, extending over a range of wavelengths in the infra-red spectrum and radiating outward from the hot body, is collected at a distance from the hot body into an optical path. The radiant energy in the whole range of wavelengths is then filtered to select therefrom only radiant energy in a band of wavelengths significantly correlated with the temperature of the hot body. Thereafter, the radiant energy in the selected band of wavelengths is caused to generate one or more electrical signals which are further modified to provide one or more indications determinative of the temperature of the hot body.

As a feature of the invention, the radiant energy may take the forms of energy absorbed by the hot body and energy emitted by the hot body, the two forms of radiant energy differing by a given characteristic permitting discrimination therebetween.

As another feature of the invention, the form of radiant energy representing emission from the hot body may be used alone to provide an indication determinative of the temperature of the hot body.

The invention may be better understood from the following detailed description of representative embodiments thereof taken in conjunction with the accompanying drawings wherein:

Figs. 1 and 2 are graphs explanatory of certain aspects of the invention;

Fig. 3 is a plan view in schematic form of apparatus in accordance with the invention;

Fig. 4 is a graph explanatory of a method in accordance with the invention;

Fig. 5 is a view in side elevation of certain details of the apparatus of Fig. 3;

Fig. 6 is a view taken as indicated by the arrows 6—6 in Fig. 5;

Fig. 7 is a view taken as indicated by the arrows 7—7 in Fig. 5; and

Fig. 8 is a block diagram showing in greater detail certain of the components of the apparatus of Fig. 3.

Considering the phenomenal basis for the present invention, it is an experimental fact that all hot combustion gases emit radiation as a result of their temperature, and that this radiation occurs at certain narrow bands in the infra-red region of the spectrum. The radiation is contributed by all polyatomic and heteronuclear diatomic molecular species present in the gas, e. g., $CO_2$, $CO$, $OH$. Homonuclear molecules, such as $N_2$ and $O_2$, do not radiate. The method involves two basic physical laws: Planck's law and Kirchhoff's law.

All emitters of thermal radiation (heat radiation) give off energy in accordance with the following law:

$$I_\lambda = e_\lambda J_\lambda = e_\lambda [c_1 A \lambda^{-5} (\epsilon^{c_2/\lambda T} - 1)^{-1}] \quad (1)$$

where $I_\lambda$ spectral radiant intensity of the emission. Spectral radiant intensity is defined as the energy per unit spectral bandwidth emitted by the source in one second through unit solid angle.

$J_\lambda$ spectral raidatn intensity of a "blackbody" radiator, defined below.

$e_\lambda$ is called the emissivity, and is a quantity (of a value less than or equal to one) characteristic of the material (gas, liquid or solid).

$c_1$ and $c_2$ are physical constants.

$A$ is the area of the hot surface.

$\lambda$ is the wavelength of the radiation.

$\epsilon$ is the base of natural logarithms.

$T$ is the absolute (Kelvin) temperature.

The quantity in square brackets is called the Planck function. When the emissivity, $e_\lambda = 1$, the formula becomes $$I_\lambda = J_\lambda = c_1 A \lambda^{-5} (\epsilon^{c_2/\lambda T} - 1)^{-1} \quad (2)$$

This is known as the Planck radiation law. No real physical object radiates exactly in accordance with this law. The Planck law is followed exactly only by an ideal thermal radiator, called a blackbody. A blackbody is defined as an object which absorbs all radiation received by it. Most objects actually reflect some of the radiation they receive, and transparent materials also transmit some radiation. The closest physical approximation to a blackbody is a small hole in a closed cavity, since radiation entering such a hole is unlikely to find its way out again. The fraction of incident radiation absorbed by an object is called its absorptivity. By definition a blackbody has an absorptivity equal to one, or 100%.

A plot of Equation 2 is shown in Fig. 1 for three temperatures $t_1$, $t_2$, $t_3$. A continuous family of such curves exists for all values of temperature.

The second physical law of importance is Kirchhoff's law. This can be stated in two ways. First, if $I_\lambda$ is the spectral radiant intensity of radiation emitted from an object and $a_\lambda$ is the absorptivity of the object, then $$\frac{I_\lambda}{a_\lambda} = J_\lambda \qquad (3)$$

In other words, the ratio of spectral radiant intensity to absorptivity equals the spectral radiant intensity of a blackbody at the same temperature. The second way of stating Kirchhoff's law is to start by defining the emissivity factor, $e_\lambda$, of Equation 1 as the ratio of the spectral radiant intensity of a hot object to the spectral radiant intensity of a blackbody at the same temperature. Then Kirchhoff's law becomes $$e_\lambda = a_\lambda \qquad (4)$$

Attention is now called to the subscript $\lambda$, which occurs in $e_\lambda$ and $a_\lambda$. This subscript signifies that the quantities refer to radiation of a specific wavelength or narrow wavelength band, not to total radiation. The fact is that Equations 3 and 4 generally hold only for single wavelengths or narrow wavelength bands. There are materials, called "gray bodies" which obey Kirchhoff's law over a wide range of wavelengths, but gases do not.

In the general terms of abstract quantitative values, temperature is determined according to the invention as follows. Referring to Equation 3, the values $I_\lambda$ and $a_\lambda$ of the hot body at a specific wavelength are determined. From these values is calculated the ratio $I_\lambda/a_\lambda$, to determine $J_\lambda$. Finally with the entries $J_\lambda$ and wavelength $\lambda$, the temperature is read off on the blackbody curve. For greatest convenience in making such entries, the data shown in Fig. 1 are plotted in the graphs shown in Fig. 2 for the wavelength values $\lambda_1$, $\lambda_2$, $\lambda_3$, for example. It will be understood that the number of such curves can be increased indefinitely. The data for a given curve in Fig. 2 may be obtained by reading off points along a line such as the dotted line in Fig. 1.

Referring now to Fig. 3 which shows one form of apparatus suitably used in conjunction with the above described procedure, the numeral 13 designates a unit adapted to act as a source for a beam 20 of infra-red radiation 14. To this end the source unit 13 includes an element 15, as, say, a Nernst glower or other glower, adapted to emit radiant energy. Measurements may be made according to the invention if this radiant energy is within the wavelength range of 1–5 microns in the infra-red spectrum. The radiant energy emanated from glower 15 follows an optical path including the following elements: a motor-driven source chopper 16, a shutter 17, a flat infra-red mirror 18 and a spherical condenser mirror 19 also reflective of infra-red energy. The spherical mirror 19 projects the beam 20 of infra-red radiation from source unit 13 through a sampling region 21 to the receiver unit 22. The term "sampling region" is used here for convenience in describing the invention. The measurement is performed without disturbing or acting upon the hot body in any way, other than to pass a beam of radiation through it, and the sampling region may be located at any conveniently accessible portion of the hot body; it is not meant here to imply by the word "sampling" that a sample of the hot body must be taken out for measurement.

The sampling region 21 contains the hot body whose temperature is to be determined. This hot body may be, for example, a very hot gas 23.

During passage through region 21 of the infra-red beam 20, the radiant energy thereof undergoes absorption at certain discrete wavelengths of the spectral distribution range of the radiant energy. As stated, the wavelengths at which absorption takes place are characteristic of the constituent gaseous components of the gas 23. One of these absorbed wavelengths is used in the course of a measurement as a reference wavelength for temperature determination.

Gas 23, being at very high temperature, will also emit infra-red radiation over a spectral distribution range at particular wavelengths characteristic of its constituents and corresponding in value with the absorption wavelengths of these constituents. It follows that the beam departing from gas 23 always includes a quantity of emission radiation 24 at the reference wavelength. When source unit 13 is not operating, the beam 25 entering receiver unit 22 is constituted entirely of this emission radiation 24. On the other hand, when source unit 13 is operating, the beam 25 entering receiver unit 22 will be constituted in part of emission radiation 24 and in part of the source radiation 14 subject to absorption in region 21.

The infra-red beam 25 entering receiver unit 22 follows an optical path which includes the following infra-red reflective elements: a spherical condenser mirror 30, a plane mirror 31 and another plane mirror 32. The last-named elements together with the optical elements of source unit 13 are of such characteristic in configuration and spacing as to focus an incandescent image 15' (Fig. 5) of the glower source 15 upon an entrance slit 33 marking the beginning of a monochromator section in receiver unit 22. Interposed in the optical path between mirror 32 and slit 33 is a motor-driven receiver chopper 34 whose function will be described hereafter.

Within the monochromator section, radiation framed by the illuminated entrance slit 33 illuminates a collimator mirror 40 which sends a beam of parallel radiation to a prism 41. The prism 41 disperses into component wavelengths the spectral distribution range of the radiant energy within the beam. The dispersed radiation from prism 41 impinges upon a Littrow mirror 42 which reflects the dispersed radiation back upon the prism. The dispersed radiation thereby goes through prism 41 a second time, undergoing further dispersion, and is returned to the collimator mirror 40. Mirror 40 focuses the radiation back in the general direction of the entrance slit 33, but before reaching the same, the retrogressive beam from mirror 40 is intercepted by the plane mirror 43 and directed to the exit slit 44 marking the end of the monochromator section.

The prism 41 has the effect of "fanning out" the radiation beam incident thereon so that each wavelength in the spectral distribution range of the beam is represented by a fan of radiation leaving the prism at a different angle to the prism face. Only one of these fans of differing wavelength radiation at a time falls on the Littrow mirror 42 at a proper incident angle for the radiation in said fan to be reflected back from the Littrow mirror along the described optical path to pass through exit slit 44. Accordingly, the radiation beam traversing this slit is composed of radiant energy occupying only a very narrow band of wavelengths compared to the original spectral distribution range of the energy in the beam traversing the entrance slit 33.

It will be seen, by shifting the angular position of the Littrow mirror 42 through an adjusting micrometer 50, that it is possible to shift the position in the infra-red spectrum of the selected band of wave-lengths. In a practical measuring operation the Littrow mirror is adjusted so that the monochromator section acts as a filter to pass only a band of wavelengths centered about the selected reference wavelength of significance to the temperature measurement of gas 23. As stated, a wavelength significant for this purpose would be the common value absorption and emission wavelength of a given constituent of the gas. Thus, if gas 23 represents the products of a combustion reaction, the selected reference wavelength may be one of the infra-red absorption and emission wavelengths for carbon dioxide or water vapor.

It will also be seen that the width of the band of wavelengths depends upon the optical characteristics of the elements in the monochromator section, particularly the widths of entrance slit 33 and exit slit 44 in their dimensions crosswise to the optical path. Within the contemplation of the invention, the width of the passed wavelength band is of 0.002 micron at the least. This specified band width value, although relatively small compared to the 1–5 microns spectral distribution range over which the reference wavelength may be selected according to the present invention, is relatively large compared to the 0.00007–0.0002 micron bandwidth which would be used if it were desired to resolve into its fine structure the infra-red radiation entering the receiver unit 22.

As a practical matter, a narrow band of wave-lengths may be considered to act, for most of the purposes of the invention, as if all the radiant energy in the band were manifested at the center wavelength. Accordingly, unless otherwise required by the context, it will be understood that observations concerning the "reference wavelength" are to be construed as applying to a band of wavelengths having the reference wavelength for a center value.

With the radiation beam having been limited, as described, to radiant energy of the reference wavelength, the beam passes through the exit slit 44 and along an optical path including the plane mirror 55 and the ellipsoidal condenser mirror 56. Mirror 56 focuses the radiation upon a detector 57 which is preferably a photo-sensitive device responsive to infra-red as, say, a lead sulfide cell, but which may be another type of infra-red sensing means, as, say, a thermocouple or a bolometer. The detector 57 responds to the incident beam by developing an electrical signal in accordance with the intensity of the incident radiation. The electric signal so developed is supplied via electrical coupling means 58 to an amplifier unit 59 to be later described in greater detail. The amplifier unit 59 is coupled by electrical coupling means 60 with a registering unit 61, to be later more fully described, adapted to perform a registering action in the nature of indicating and/or recording and/or a similar operation. In the presence of the signal from detector 57, the amplifier unit 59 and registering unit 61 cooperate together to provide a reading or readings representing the intensity of the detected radiation.

The described apparatus may be utilized in conjunction with the carrying out of both "double-sided" and "single-sided" methods for determining the temperature of the hot gas 23 in sampling region 21. For an understanding of the basis for one double-sided method, assume that initially the source unit 13 is operated without any gas 23 being present in the sampling region 21. Assume, also, that the glower source 15 emanates infra-red radiation at reference wavelength with an intensity value of $I_0$. The registering unit 61 will accordingly provide a reading representing $I_0$.

With $I_0$ determined, the hot gas 23 is streamed through region 21 while source unit 13 is operating to produce its radiation beam 20. In response, the registering unit gives a reading representative of $(I+I_\lambda)$ where $I_\lambda$ is, as defined, the intensity of radiation emitted from gas 23, and $I$ is the intensity of the source radiation after absorption. Thereafter, source unit 13 is shut off while the hot gas 23 is still streamed through region 21. In response, the registering unit 61 now gives a reading representative of $I_\lambda$ only.

From the three readings thus obtained, the temperature of gas 23 may be determined as follows. The reading $I_\lambda$ is subtracted from the reading $(I_\lambda+I)$ to give the value $I$. From the value $I$ and the reading $I_0$ the absorptivity value, $a_\lambda$, can be determined by the following equations $$I=I_0(1-a_\lambda) \quad (5)$$

$$a_\lambda=1-\frac{I}{I_0} \quad (6)$$

Having determined $a_\lambda$, the value of the ratio $I_\lambda/a_\lambda$ is calculated. From Equation 3 the value of this ratio equals $J_\lambda$. Using the wavelength value $\lambda$ at the reference wavelength and the determined value of $J_\lambda$, the graph in Fig. 2 is entered to determine the temperature of gas 23.

From the nature of the described apparatus, it will be evident that the readings obtained by registering unit 61 represent relative rather than absolute indications of the values of the variables entering into the determination of gas temperature. Accordingly, it is necessary that the apparatus be calibrated to establish a correlation between the obtained readings and the scale values of the graph in Fig. 2. This calibration may be effected in accordance with a procedure discovered by the applicants and outlined in a publication entitled, "Infra-Red Monochromatic Radiation Method," published in May 1950 by the Wright-Patterson Air Force Base, Dayton, Ohio, as Air Force Technical Report No. 6064. The essential features of this calibration are the calculation, from measurement of radiant emission at a single temperature from a standard radiation source, of a complete curve of equivalent blackbody intensity against temperature for the measuring apparatus. This standard radiation source may be any suitable radiation source, the temperature of which can be determined by an optical pyrometer, using a filter of equivalent wavelength 0.667 micron as prescribed by the International Temperature Scale of 1948.

The procedure of calibration outlined in the mentioned publication, inasmuch as it involves extrapolation by calculations from a single measured temperature value, extends the range of determinable temperature far beyond the usual limit of 1500° C. when the calibration is made by actual measurements of the range of temperatures of a conventional calibrating source, the 1500° C. figure being the highest temperature which can be reached conveniently by such source, and this procedure is simpler and more accurate than actual measurements over the entire range. In fact, according to the present invention, there is no upper limit for the determinable temperature, and, in practice, it has been possible to measure the temperature of combustion gases varying all the way from 600° C.–3550° C.

All of the forms of the double-sided method require determination at reference wavelength of both the emissivity of the gas (by measurement of its absorption) and of the emission of the gas. It has previously been considered that the use of both such factors was necessary because of the previously held belief that temperature was not the sole physical parameter determining the value of these factors, and that, conversely, it was not feasible to work backwards to temperature from one of these factors by way of a simple quantitative correlation. We have discovered, however, in at least the case of the measurement of the temperature of a gas in the nature of a product of a premixed combustion reaction, that the values of the factors, temperature, emissivity, and emission all change with a change in the value of the fuel-air ratio of the burning mixture, but that, taking this relation into account, for particular temperature ranges and within acceptable accuracy limits, the temperature variation may be considered as correlated with the emission variation only. This fact is illustrated in Fig. 4. As shown therein, over a relatively small (for example, 100°) temperature range, the emission changes pronouncedly with temperature, but the emissivity remains almost constant. Thus, within this temperature range, to an accuracy of one or two percent, the emissivity can be considered constant. By Equation 4, the emissivity $e_\lambda$ equals the absorptivity $a_\lambda$. Hence, any temperature within this small range can be determined to an acceptable accuracy by using the same value over the entire range for the term $a_\lambda$ in Equation 3, once the proper value for $a_\lambda$ in this range has been ascertained.

It has further been found that at high temperatures the curve of emissivity versus temperature levels off completely (or, in other words, shows saturation), and hence the absorption factor $a_\lambda$ in Equation 3 may be replaced by a constant over a much larger range at high temperatures.

It follows that, within particular ranges wherein the emissivity is or may be considered constant, the temperature of appropriate hot bodies is determinable by a "single-sided" method wherein the source unit 13 is not used, and wherein the radiation entering receiver unit 22 consists entirely of the radiation 24 emitted from the hot body. The intensity of this radiation is, in the usual manner, registered by the registering unit 61. The reading of $I_\lambda$ thus obtained is utilized to determine temperature according to the procedure, heretofore described, of finding $J_\lambda$ and of entering the graph of Fig. 2 with the found value of $J_\lambda$ and with the value $\lambda$ of the reference wavelength.

Of course, if the actual temperatures within a given "constant" emissivity range are desired, it is necessary to determine, at least once, the actual value of emissivity obtaining at a representative temperature in the range. This emissivity determination may be made, for example, by the preferred form of double-sided method hereafter described. Having once been determined, the emissivity value can be used as a constant to thereafter determine all temperatures in the range.

The single-sided method is of greatest application, not in the measurement of temperatures which may vary much more widely than the variation comprehended by a "constant" emissivity range, but rather in conjunction with a temperature control system which automatically restores a drifted temperature to a reference value. In such mode of control, the largest temperature drift which can occur before correction may be corrected by a temperature determination which assumes that the emissivity is constant. In this application of the single-sided method, it is clear that the absolute value of the temperature measured is of little importance. It is only necessary that the temperature be measured in a relative sense to determine the amount of any drift occurring with respect thereto.

It will be noted in both the case of the basic form of double-sided method and of the single-sided method that the radiation measured by detector 57 occupies a bandwidth of 0.002 micron at the least. The broadness of this bandwidth is advantageous inasmuch as it permits an initial calibration of the apparatus and later measurements by the apparatus at a mean wavelength which, in theory, should be the same for the calibration and for the measurement, but which in the course of the actual measurements may drift away from the calibration value because of slight changes in the optical system and so forth. By employing a relatively broad bandwidth of measured radiation, the error-producing effect of this drift upon the obtained readings is minimized for the reason that the relatively broad bandwidth contains a large number of fine infra-red lines, none of which can individually affect to any great extent the average intensity value of the bandwidth as detected by the detector 57. Hence, a change in composition of the bandwidth by a few infra-red lines from one measurement to another will have a negligible effect upon the accuracy of the readings. On the other hand, were the bandwidth to be so narrow that only a few infra-red lines were contained therein, the intensity of each line would be critical to the measurement, and a change by a few lines in the bandwidth composition, or a slight change in the width itself of the band, would cause a substantial error in the readings. An additional advantage to said broadness of bandwidth is that the optical system required is much simpler than that required to resolve the spectrum into its fine strucure components. Still a further advantage is that the energy radiated by the hot body within said bandwidth is sufficient to enable a high degree of accuracy in the measurement, while the energy available from a bandwidth including only a few infra-red lines would be too small to measure accurately.

For conversion of the described apparatus from double-sided to single-sided operation, it is necessary only that the beam 20 from source unit 14 be cut off as, say, by extinguishing the glower source 15 or by interposing the shutter 17 in the optical path. It should also be noted that both the double-sided method and the single-sided method can be carried out whether the electrical signal from detector 57 is of direct current or alternating current nature. Provision in one manner is made for an alternating current electric signal by the receiver chopper 34 which periodically interrupts the radiation beam 25 to produce pulsations therein. These pulsations cause detector 57 to reproduce the radiation incident thereon as an alternating signal.

While the basic form of double-sided method described above represents the most general method for determining temperature by absorption and emission measurements, the method as heretofore described is characterized by certain disadvantages. For example, the method requires the process step of determining the value $I_\lambda$ with source unit 13 cut off, and the calculation step of subtracting $I_\lambda$ from the previously obtained value $(I_\lambda + I)$ in order to determine $I$. These mentioned steps are not only time consuming, but may be productive of error, since the value of $I$ may change between the steps giving the respective readings for the quantities $(I_\lambda + I)$ and $I_\lambda$ alone.

In accordance with the invention these undesired steps can be eliminated by a preferred form of double-sided method. The features of the apparatus permitting this method to be carried out will now be discussed.

Referring to Figs. 5, 6, 7 and 8, the source chopper 16 (Figs. 5 and 6) and the receiver chopper 34 (Figs. 5 and 7) each produce chopping of the radiation beam at a different frequency. While these separate chopping frequencies may be synchronous or nonsynchronous, for simplification of the apparatus it is often convenient to have the frequencies synchronous. However, the choppers need not have any particular phase relation to each other. Thus, in Fig. 5 the source chopper 16 and the receiver chopper 34 are driven by respective synchronous motors 65, 67 fed from a common power source 68 which supplies alternating current at 60 C. P. S. The source chopper 16 is shaped to interrupt the radiation beam twice for each revolution thereof, while the receiver chopper 34 is eight bladed to interrupt the beam a corresponding number of times in each revolution. Thus, radiation pulsations at 120 C. P. S. and at 480 C. P. S. will be respectively introduced by the choppers 16 and 34.

It will be noted that the source chopper 16 inasmuch as it lies between the glower source 15 and the sampling region 21, introduces its 120 C. P. S. pulsation into the source radiation 14. The receiver chopper 34, on the other hand, since it follows the region 21 in the direction taken by the radiation, impresses its 480 C. P. S. pulsation on the emission radiation 24. Thus, there is associated with each of these forms of radiations a characteristic pulsation which can be used, as later described, at a subsequent stage in the apparatus to discriminate one form of radiation from the other. Of course, this discrimination could also be carried out by the use of choppers differing in phase instead of choppers differing in frequency.

In an arrangement wherein both choppers are fully in the radiation beam, while the emitted radiation 24 would be modulated at only a 480 C. P. S. rate, the radiation 14 subject to absorption would be modulated at both a 120 C. P. S. rate and a 480 C. P. S. rate. This result would be disadvantageous in some ways, since the 480 C. P. S. infra-red signal reaching detector 57 (Fig. 3) would consist of a source radiation component and an emitted radiation component, or in other words, would represent the value $I+I_\lambda$. To avoid this difficulty of a mixed 480 C. P. S. signal with its attendant requirement of a subtraction step to obtain the value I, a mask 70 (Fig. 5) is disposed over a portion of glower 15 so that the radiation from the glower passes through the source chopper 16 only on one side of the axis 71 for the optical path.

As previously described, the optical system for the radiation beam is such as to produce a focused image 15' of the glower 15 at the entrance slit 33 for the monochromator section in receiver unit 22. This image appears, as shown in Fig. 5, in inverted form on the opposite side of axis 71 from glower 15. The receiver chopper 34 is of such configuration that its blades, at their furthermost extent into the optical path, only reach as far as the optical axis 71. Hence, the source radiation 14 will not be modulated by chopper 34 at the 480 C. P. S. rate, but, instead, will be modulated only at the 120 C. P. S. rate by source chopper 16.

Considering the radiation 24 emitted by gas 23, the chopped portion of this radiation will be permitted to illuminate only at the lower half of the entrance slit 33. Thus the beam at the entrance slit is axially split into source radiation and emission radiation. Further, the emission radiation will be chopped by receiver chopper 34 at the 480 C. P. S. rate, but will not be chopped at the 120 C. P. S. rate. Since, following chopper 34, no further modulation of any of the radiation occurs, it will be seen that, of the 120 C. P. S. and 480 C. P. S. infra-red signals reaching detector 57, the 120 C. P. S. signal represents entirely and exclusively the source radiation subjected to absorption, while the 480 C. P. S. signal represents entirely and exclusively the radiation emitted from the hot gas 23 in sampling region 21.

Of course, the unchopped portion of emitted radiation 24, at region 21 in the same path as radiation 14, will continue to travel with source radiation 14. This portion of radiation 24 is, however, not subjected to any chopping action whatever, and, hence, is in the nature of a continuous rather than a pulsating infra-red signal. By virtue of its continuous nature, this extraneous infra-red signal of emitted radiation may be eliminated by means now to be described.

The detector 57 when exposed to the 120 C. P. S. infra-red signal, the 480 C. P. S. infra-red signal and the extraneous continuous infra-red signal, will generate electrical signals of corresponding characteristic. These signals are fed by lead 58 to a preamplifier network 75 adapted to pass alternating signals only. Accordingly, the direct current electrical signal corresponding to the extraneous infra-red signal will be eliminated by the preamplifier.

The output of preamplifier 75, consisting of 120 C. P. S. and 480 C. P. S. alternating signals, is commonly fed to a narrow band pass filter 76a and another narrow band pass filter 76b. Filters 76a and 76b are respectively tuned to 120 C. P. S. and to 480 C. P. S. so that the filters pass on, to respectively associated amplifiers 77a, 77b, only alternating signals of the respective pass frequencies of the filters. Thus, amplifiers 77a and 77b receive, respectively, only a 120 C. P. S. signal and only a 480 C. P. S. signal. These signals after undergoing amplification are respectively fed via the leads 60a, 60b to the rectifying voltmeters 78a, 78b. These voltmeters each produce an indication of the amount of signal received thereby. From the foregoing description it will be seen that the indication of voltmeter 78a represents the value of I, the intensity of the source radiation after absorption in gas 23. The indication of voltmeter 78b, by the same token, represents the quantity $I_\lambda$, the intensity of the radiation emitted from gas 23. These two voltmeter readings are used in the double-sided method to determine the temperature of gas 23 according to the procedure outlined heretofore.

It will be noted that the indication of voltmeter 78 is in the nature of an indication which decreases with increase in absorption. This is so for the reason that with zero absorption of the source radiation in gas 23, the maximum amount of radiation will pass through the source to give a maximum reading of $I_0$ on voltmeter 78a. As the degree of absorption of source radiation increases, the indication of this voltmeter will correspondingly decrease from $I_0$ downward.

While the voltmeters 78a, 78b conjointly provide an indication in the form of respective readings which are together determinative of the temperature of hot gas 23, it is often convenient for this temperature determination to be made from a single reading. To this end, the separate signals actuating the two voltmeters may be fed to a computing means in the form of a conventional subtraction network 80 and a conventional division network 81. The single output indication of the computing means is indicated by a voltmeter 82.

Considering the function of subtraction network 80, as stated above when the absorption of gas 23 increases, the I signal to voltmeter 78a correspondingly drops from a value $I_0$ which is a constant for a given calibration of the apparatus. In this connection when Equation 5 is rewritten as follows $$I_0-I=I_0 a_\lambda \tag{7}$$

the left-hand side of the equation represents the mentioned decrease in magnitude of the considered signal. The subtraction network 80 is adapted in a well-known manner to represent this decrease in signal magnitude by an electrical potential of commensurate value. Thus, this electric potential represents $I_0 a_\lambda$.

The division network 81 receives the signal, $I_\lambda$, actuating voltmeter 78b. Division network 81 also receives the mentioned signal of value $I_0 a_\lambda$. Within the division network the effect of the constant term, $I_0$, in the $I_0 a_\lambda$ signal is balanced out in a well-known manner and the remaining $a_\lambda$ signal value is electrically divided into the $I_\lambda$ signal from voltmeter 78b. The output of division network 81 will accordingly be a signal of the value $I_\lambda/a_\lambda$. Hence, as shown by Equation 3, the voltmeter 82 will indicate the quantity $J_\lambda$. From this $J_\lambda$ reading the temperature of the hot gas can be determined according to the procedure heretofore described.

When the chopping frequencies selected for source chopper 16 and receiver chopper 34 bear a synchronous relation to each other, and particularly when the higher frequency is a multiple of the lower frequency, the alternating signal derived by detector 57 from the lower frequency pulsating radiation may contain a harmonic of the same frequency value as the signal derived from the higher frequency pulsating radiation. Such harmonic will pass through the same electrical channel as the higher frequency signal to produce an error in the reading thereof. To overcome this difficulty it is desirable that the radiation subjected to the lower frequency chopper be modulated by the chopper so that the variation in radiation conforms as close as possible to a sinusoidal form and, hence, is free of harmonics.

In the present instance, the lower frequency chopper is the source chopper 16. The desired sinusoidal modulation of the source radiation by chopper 16 is obtained by the configuration of the chopper. This configuration is best shown in Fig. 6. The circumference of source chopper 16 follows a locus which, in terms of polar coordinates, is defined by the expression $$r=R+d \sin \theta$$

where R and d are constants. As seen in Fig. 6, the constant R represents the size of the minimum radius 85 of the chopper. The other constant d may be set equal to the length in the optical path of the unmasked portion of glower 15. The rotation axis of chopper 16 lies directly below the glower at a distance R from the tip thereof.

In operation, when chopper 16 rotates, the chopper cuts off a varying proportion of the entire body of radiation emanating from source 15. Assuming that $\theta$ is taken as the angle generated between the minimum radius 85 of chopper 16 and the line of extension of glower 15 when the chopper rotates, the chopper 16 will cut off minimum and maximum amounts of source radiation at respective values for $\theta$ of 0° and 90°. Between the minimum and the maximum, the proportion of total radiation cut off will vary in a sinusoidal manner. Hence, the proportion of total source radiation which passes the chopper will also vary in a sinusoidal manner. This sinusoidal variation in the source radiation acts upon detector 57 so that the same develops a corresponding alternating signal which is free of harmonics.

While the foregoing description of Figs. 5, 6, 7 and 8 has been given in particular connection with the carrying out of a preferred form of double-sided method for determining temperature, it will be appreciated that the apparatus as set forth in this description is suitable for carrying out the single-sided method as well. In the practice of the single-sided method, the source unit 13 (Fig. 3) is not utilized. As a result, the radiation beam entering receiver unit 22 consists entirely of the radiation 24. The radiation 24 will, however, continue to be modulated at a 480 C. P. S. rate by the receiver chopper 34. Thus, in the single-sided method, the detector 57 will continue to supply a 480 C. P. S. alternating signal to voltmeter 78b (Fig. 8) (although no 120 C. P. S. signal is fed to voltmeter 78a). The 480 C. P. S. signal is, as before, indicated by voltmeter 78b as a reading of the quantity $I_\lambda$.

Whether the double-sided or single-sided method is used, the fact that the radiation reaching detector 57 is chopped to produce an alternating signal creates advantages other than the advantage mentioned heretofore of separating the source radiation and emitted radiation by the use of separate chopping frequencies for each. For example, since the output of the detector is of alternating nature, alternating current amplifying means may be utilized to avoid both the complexity of direct current amplifying systems and the disadvantage of such systems that they are prone to signal drift.

The described methods and apparatus being illustrative only, it will be understood that the invention comprehends methods and apparatus differing in form or in detail from the described methods and apparatus. Accordingly, the invention is not to be construed as limited save as is consonant with the scope of the following claims.

We claim:

1. A method for providing an indication which of itself is fully determinative in at least a relative sense of the temperature of a hot gas, said method comprising the steps of, collecting at a distance from said gas a solid angle of radiation emitted therefrom within the 1–5 micron wavelength range of the infra-red spectrum, filtering said collected radiation to separate therefrom the component of radiation in a wavelength band inclusive of an emission wavelength of a gas constituent having molecular size particles which are at least diatomic and which are of diverse atom content when diatomic, said wavelength band being relatively narrow with respect to said range, but being at least 0.002 micron wide, and determining the intensity of said separated radiation, said intensity being the indication of the temperature of said gas.

2. A method for providing an indication which of itself is fully determinative in at least a relative sense of the temperature of gas having a temperature exceeding 600° C., said method comprising the steps of, collecting at a distance from said gas a solid angle of radiation emitted by said gas within the 1–5 micron wavelength range of the infra-red spectrum, filtering said collected radiation to separate therefrom the component of radiation concentrated in a wavelength band containing an emission wavelength of a gas constituent having molecular size particles which are at least diatomic and which are of diverse atom content when diatomic, said wavelength band being realtively narrow with respect to said range but being at least 0.002 micron wide, and developing from said separated radiation an alternating electric signal indicative of the intensity thereof.

3. A method as in claim 2 wherein the radiation emitted from said gas is periodically interrupted to produce the alternating characteristic in said electric signal.

4. A method for providing plural indications conjointly determinative in at least a relative sense of the temperature of a hot gas, said method comprising the steps of, passing through said gas a beam of infra-red radiation which in wavelength includes an absorption-emission wavelength of a gas constituent having molecular size particles which are at least diatomic and which are of diverse atom content when diatomic, said radiation being partially absorbed at said absorption-emission wavelength by passage through said gas, collecting at a distance from said gas a solid angle of radiation comprised both of partially absorbed radiation and of radiation emitted from said gas over an infra-red sepectrum including said absorption-emission wavelength, filtering said collected radiation to separate therefrom the components of partially absorbed and emission radiation which are each concentrated within a wavelength band containing said absorption-emission wavelength, said wavelength band being of narrow width relative to the width of said spectrum, developing from said component of separated and partially absorbed radiation an electric signal indicative of the respective intensity thereof, and developing from said component of separated emission radiation another electric signal indicative of the respective intensity thereof.

5. A method for providing plural indications conjointly determinative in at least a relative sense of the temperature of a hot gas, said method comprising the steps of, generating a pulsating beam of infra-red radiation which in wavelength includes an absorption-emission wavelength of a gas constituent characterized by having molecular size particles which are at least diatomic and of diverse atom content when diatomic, passing said pulsating beam of radiation through said gas to be partially absorbed thereby, collecting at a distance from said gas a solid angle of radiation comprised both of partially absorbed radiation and of radiation emitted from said gas over an infra-red spectrum including said absorption-emission wavelength, filtering said collected radiation to separate therefrom the components of partially absorbed and emission radiation which are each concentrated within a wavelength band containing said absorption-emission wavelength, said wavelength band being of narrow width relative to the width of said spectrum, developing from the pulsations of said separated component of partially absorbed radiation an alternating electric signal indicative of the respective intensity thereof, and developing from said separated component of emission radiation an electric signal indicative of the respective intensity thereof.

6. A method for providing plural indications conjointly determinative in at least a relative sense of the temperature of a hot gas, said method comprising the steps of, generating a beam of infra-red radiation which pulsates at a first frequency and which in wavelength includes an absorption-emission wavelength of a gas constituent having molecular size particles which are at least diatomic and of diverse atom content when diatomic, passing said beam of radiation through said gas to be partially absorbed thereby, collecting at a distance from said gas a solid angle of radiation comprised both of partially absorbed radiation and of radiation emitted from said gas over an infra-red spectrum including said absorption-emission wavelength, interrupting the collected emission radiation to produce therein a pulsation at a second frequency, thereafter filtering said collected radiation to separate therefrom the components of partially absorbed and emission radiation which are each concentrated within a wavelength band containing said absorption-emission wavelength, said wavelength band being of narrow width relative to the width of said spectrum, said absorption and emission radiation components being both in a common optical path, developing alternating electric signals in a common channel at said first and said second frequency from the respective pulsations of said partially absorbed radiation component and said emission radiation component in said optical path, and separating one signal from the other by frequency discrimination to provide in respective channels of separate ones of said signals, each signal output being indicative of the radiation component wherefrom the output was derived.

7. A method for providing plural indications conjointly determinative in at least a relative sense of the temperature of a hot gas, said method comprising the steps of, generating a beam of radiation which pulsates at a first frequency and which in wavelength includes an absorption-emission wavelength of a gas constituent having molecular size particles which are at least diatomic and of diverse atom content when diatomic, passing said radiation through said gas to be partially absorbed thereby, collecting into a first portion of an optical path at a distance from said gas the partially absorbed radiation, collecting into a second portion of said optical path radiation emitted from said gas over an infra-red spectrum including said emission-absorption wavelength, chopping the emitted radiation in said second optical path portion to produce pulsations therein at a second frequency, filtering said radiation in both portions of said optical path to separate therefrom the components of partially absorbed and emission radiation which are each concentrated within a wavelength band containing said absorption-emission wavelength, said wavelength band being of narrow width relative to the width of said spectrum, developing from said separated component of partially absorbed radiation an electrical signal indicative of the respective intensity thereof, and developing from said separated component of emission radiation an electric signal indicative of the respective intensity thereof.

8. Radiant energy measurement apparatus for determining the temperature of a hot gas, said apparatus comprising, optical means spaced from a region of said gas for collecting into an optical path a solid angle of the radiation emitted from said gas within the 1–5 micron wavelength range of the infra-red spectrum, filter means operable in said path to separate from the collected radiation that component thereof lying within a wavelength band containing an emission wavelength of a gas constituent having molecular size particles which are at least diatomic and of diverse atom content when diatomic, said wavelength band being relatively narrow with respect to the width of said wavelength range but being of 0.002 micron width at the least, detector means disposed in said optical path in responsive relation with said separated radiation to provide electric signals as a function of the intensity thereof, and register means responsive to said electric signals to provide readings thereof.

9. Apparatus as in claim 8 further characterized by means for rendering said electric signal an alternating signal.

10. Radiant energy measurement apparatus comprising, infra-red source means adapted to pass through a region of hot gas a beam of radiation, the spectrum of said radiation including an absorption-emission wavelength of a gas constituent having molecular size particles which are at least diatomic and of diverse atom content when diatomic, means for producing pulsations at a first frequency in the radiation of said beam prior to passage through said gas, means for producing pulsations at a second frequency in radiation emitted from said gas at said absorption-emission wavelength, electro-optical means simultaneously responsive to pulsating radiation at said wavelength which has passed through said gas and to pulsating emission radiation at said wavelength from said gas for producing admixed alternating electric signals of first and second frequency as respective responses to the pulsations of said last named radiations and a pair of signal transfer networks respectively tuned to said first and second frequencies for sparating said admixed alternating signals to provide respective outputs from said networks of separate ones of said signals.

11. Apparatus as in claim 10 wherein the means for producing the lower frequency of said first and second frequency pulsations of radiation is a means adapted to produce pulsations having a sinusoidal variation in time.

12. Radiant energy measurement apparatus comprising, infra-red source means adapted to pass through a region of hot gas a beam of infra-red radiation, the spectrum of said radiation including an absorption-emission wavelength of a gas constituent having molecular size particles which are at least diatomic and of diverse atom content when diatomic, said radiation being partially absorbed by passage through said gas, means for producing pulsations at a first frequency in the radiation of said beam prior to passage through said gas, means for collecting the radiation departing from said hot gas into an optical path, said departing radiation being comprised of a component of pulsating partially absorbed radiation at said wavelength and a component of radiation emitted by said gas at said wavelength, optical means for confining the spatial distribution of said partially absorbed radiation component at a given point in said path to a fractional cross section area thereof disposed within said path to one side thereof, chopper means projecting at said point into said path from the other side thereof by a distance falling short of said cross section area for producing pulsations at a second frequency in said emission radiation component, detector means in said optical path for producing an output in the form of alternating signals at said first and second frequencies representing respective responses to said pulsating components of partially absorbed and emission radiation, and a pair of signal transfer networks having respective inputs commonly coupled with the output of said detector means and being respectively tuned to said first and second frequencies for separating said admixed signals to each provide a respective output of a separate one of said signals.

13. Radiant energy measurement apparatus comprising, infra-red source means adapted to pass through a gas a beam of radiation including an emission-absorption wavelength of a gas constituent having molecular size particles which are at least diatomic and which are of diverse atom content when diatomic, said radiation being partially absorbed during passage through said gas, means for developing first and second electric signals respectively representing the intensity of said partially absorbed radiation at said wavelength and the intensity of radiation emitted by said gas at said wavelength, a subtraction network responsive to said first signal to provide an output representative of the absorptivity of said gas, and a division network responsive to said output and to said second signal to provide an indication of the quantitative relation between the radiant emission of said gas and the absorptivity thereof.

References Cited in the file of this patent

UNITED STATES PATENTS

| | | |
|---|---|---|
| 2,451,572 | Moore | Oct. 19, 1952 |
| 2,650,307 | Koppius | Aug. 25, 1953 |
| 2,679,184 | Atwood | May 25, 1954 |